July 14, 1931.    E. J. D. COXE    1,814,897
APPARATUS FOR UTILIZING SOLAR HEAT
Filed Jan. 22, 1926    3 Sheets-Sheet 1
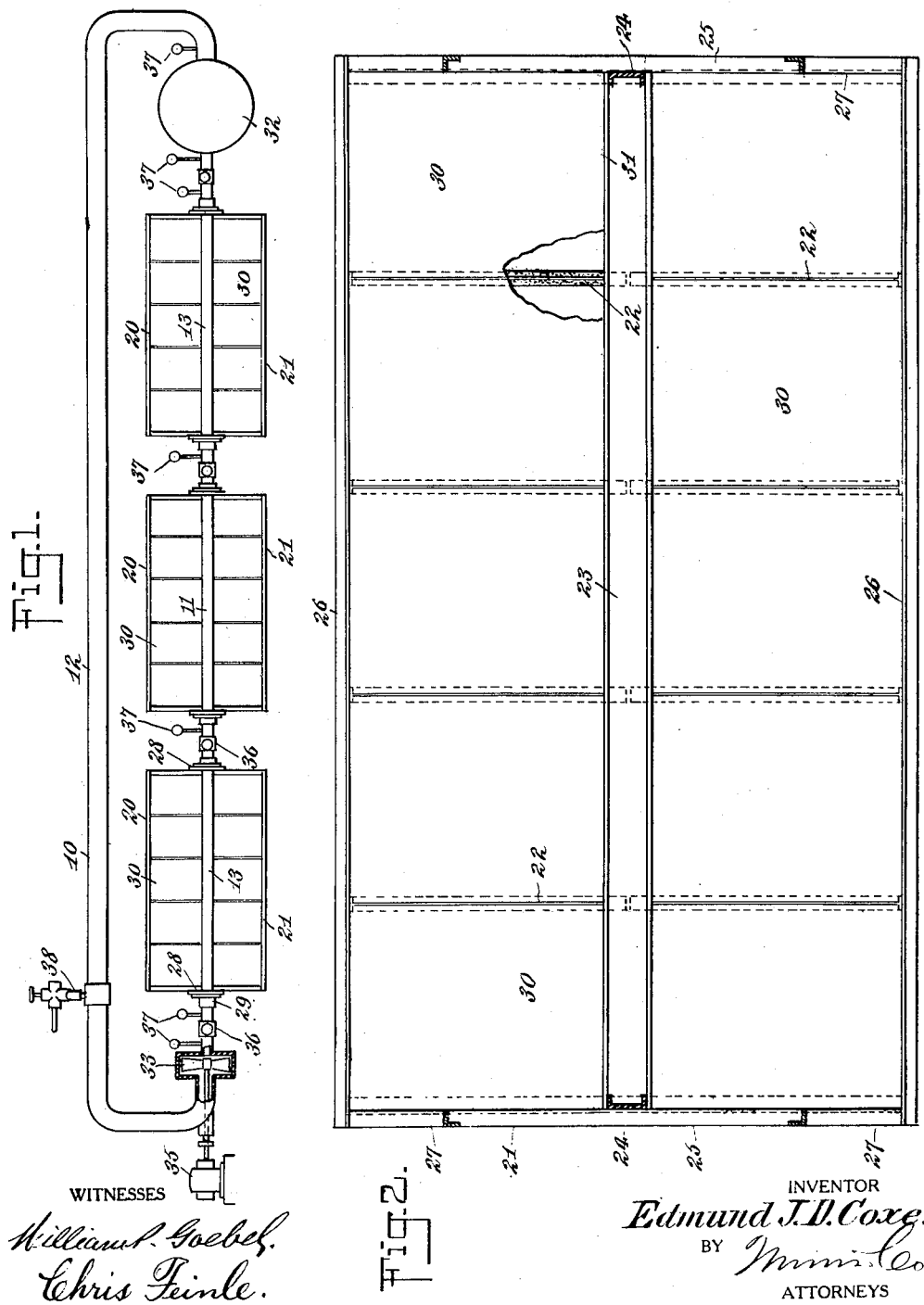

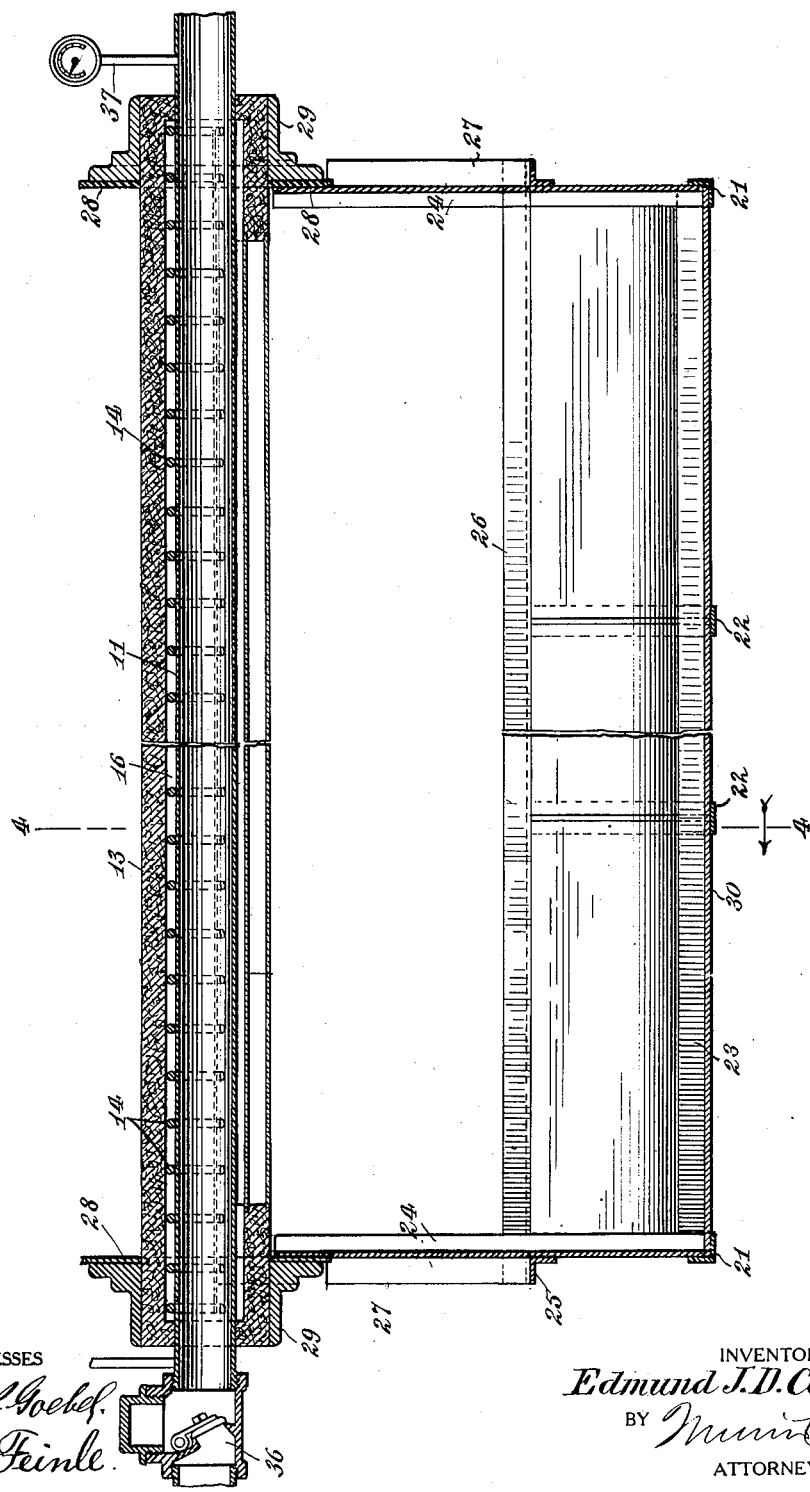

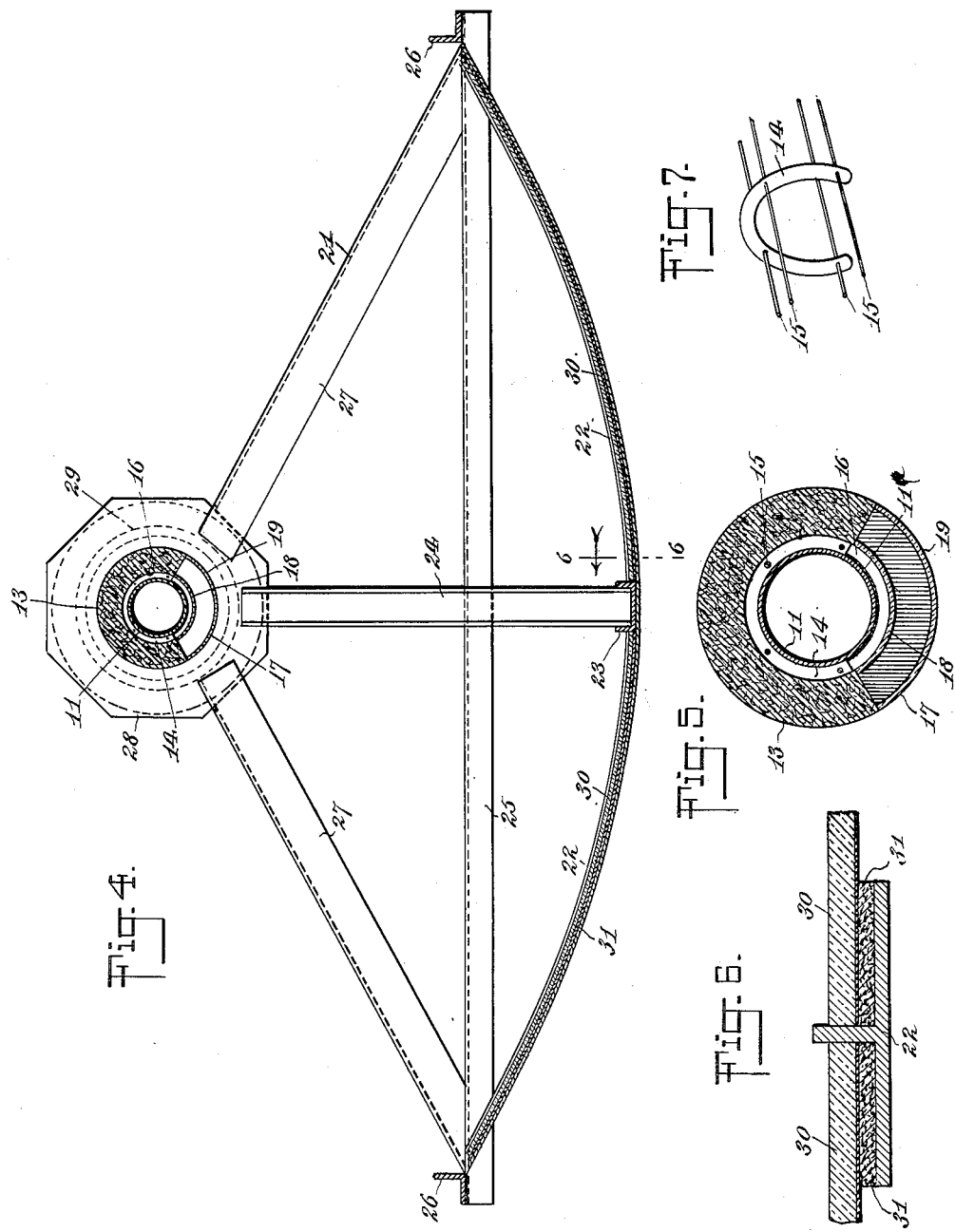

Patented July 14, 1931

1,814,897

UNITED STATES PATENT OFFICE

EDMUND J. D. COXE, OF PHILADELPHIA, PENNSYLVANIA

APPARATUS FOR UTILIZING SOLAR HEAT

Application filed January 22, 1926. Serial No. 83,098.

This invention relates to apparatus for utilizing solar heat and with which the solar heat is converted into energy to render it available for practical purposes.

The principal object of the present invention is to provide an improved apparatus of the indicated character so that the same will be more thoroughly efficient and in construction and effectual in use, and especially to increase its thermal efficiency.

Another object of the invention is to utilize air as a medium for conducting or conveying heat derived from the rays of the sun or radiant free heat to a point of application for industrial purposes, or the performance of work in any known way.

With the foregoing and other objects in view, the invention resides in the particular provision, arrangement or assemblage, and functions of the parts hereinafter fully described and illustrated in the accompanying drawings, in which—

Figure 1 is a diagrammatic plan view of the apparatus of the present invention.

Figure 2 is a plan view of the cradle which supports the reflecting mirrors of one of the units.

Figure 3 is a central longitudinal sectional view of one of the units of the apparatus.

Figure 4 is a transverse sectional view taken on the line 4—4 of Fig. 3 and looking in the direction indicated by the arrow.

Figure 5 is a transverse section through the fluid conduit and its heat insulating jacket and showing the transparent section thereof.

Figure 6 is a detail sectional view taken on the line 6—6 of Fig. 4 and looking in the direction indicated by the arrow.

Figure 7 is a detail perspective view of a portion of the means employed for spacing the heat insulating jacket from the fluid conduit.

Generally stated, the present invention contemplates the use of a continuous fluid conduit which will be filled with air, and the said fluid conduit in whole or in part will be provided with a jacket which restricts the radiation of heat from said fluid conduit. A heat radiator in the form of a receptacle or vessel is in communication with the fluid conduit which radiates heat for practical purposes. Means is provided for circulating the air in the conduit. Means is also provided for introducing air into the conduit to keep its supply up to a predetermined quantity. The fluid conduit is provided with any suitable number of transparent portions of glass or mica on which free radiant energy is concentrated by a corresponding number of reflectors to heat portions of the fluid conduit and the fluid or air within the same to an increased temperature.

More specifically stated the apparatus comprises the elements, parts, and instrumentalities and their functions respectively presently to be described. The apparatus includes a fluid conduit 10 which will be made up of parts connected together in any suitable manner so as to be of continuous construction and to provide a section 11 and a section 12. The section 11 is approximately five inches in diameter and the section 12 is approximately ten inches in diameter. The section 11 is preferably of copper because of its great heat conducting properties. The fluid conduit 10 has a jacket 13 and the said jacket surrounds the section 11. The jacket is intended for insulating the section 11 of the fluid conduit to restrict the radiation of heat and to this end the jacket is made preferably of magnesia and asbestos. The jacket 13 is of a size to be spaced from the section 11, and is maintained in its spaced relationship by virtue of a spacing means which comprises a plurality of spacers 14 which are held in spaced relationship with respect to each other by wires 15. Each spacer 14 is of horseshoe shape and therefore does not entirely surround the section 11, as shown most clearly in Fig. 5. It will, therefore, be understood that a space is provided between the section 11 and the jacket 13 which is indicated at 16. The space 16 provides a chamber surrounding the section 11 in which a complete or partial vacuum may be established to aid in the reduction of the loss of heat by radiation.

In order to permit radiant energy from the original source, from the sun for instance, to be concentrated on portions of the fluid conduit section 11, there are provided transparent portions or sections 17. The said transparent portions or sections 17 are supported in openings arranged at intervals in the wall of the jacket 13 and are of glass or mica. In the present instance each transparent portion or section 17 is made up of two pieces of glass 18 and 19 which are spaced from each other as shown most clearly in Fig. 5. The portions of the copper section 11 of the conduit 10 are coated with lamp black 11a adjacent each transparent portion or section 17 in order to prevent reflection at this point and to augment the absorbing properties of the section 11. The rays of the sun are concentrated or focused on the transparent portions or sections 17 respectively, and therefore on the section 11 by units 20. Each unit includes a cradle 21. Each cradle includes transversely arranged T-irons 22 arranged in spaced relationship and connected by a channel iron 23 arranged centrally thereof. Rising from the channel iron 23 are uprights 24. Connected to each upright 24 is an angle iron 25 arranged transversely thereof, and angle irons 26 have their opposite ends respectively connected to the angle irons 25. The opposite ends of the T-irons 22 are connected respectively to the angle irons 26. Angle irons 27 are connected diagonally between the angle iron 25 at each end of the cradle and a plate 28 to which the upper end of each upright 24 is also connected. Each plate 28 is carried by a cast iron bearing 29 connected to the jacket 13. Each cradle 21 supports a plurality of reflectors 30 which are in the nature of mirrors copper plated at their backs. Each reflector 30 fits between adjacent T-irons 22 and rests on felt strips 31 arranged respectively on the horizontally disposed flanges of the T-irons 22. It is to be noted that both the reflectors 30 and the T-irons 22 are arcuate and when the reflectors are arranged as explained, there is produced a parabolic reflecting or focusing means for concentrating or focusing the rays of the sun on the transparent portions or sections 17 through which the rays pass to the blackened portions of the copper section 11 of the fluid conduit 10, which absorb the energy of the rays causing heating of the conduit 10 and the air therein.

In order to confine a comparatively large quantity of the heated air for its application for any desired purpose, there is provided a radiator 32 of any preferred design or construction which is in communication with the fluid conduit 10.

In order to keep the air in the conduit 11 circulating, there is provided a means in the form of a fan 33, the casing 34 of which is in communication with the conduit 10. The fan may be operated in any preferred manner and in the present instance is operated by a motor 35. The fan 33 circulates the air in one direction through the section 11 of the conduit toward the radiator 32, into the radiator and out of the radiator. In order to prevent the air from circulating in an opposite direction due to expansion and pressure, the section 11 of the conduit is provided with check valves 36 which are arranged at intervals between the transparent portions or sections 17.

In order that the temperature in the conduit 10 may be known at all times there are provided thermometers or pyrometers 37 which are in communication with the conduit 10 at different points so that the temperature condition at different points in the conduit 10 may be known. Additional air may be introduced into the conduit 10 when the occasion demands through a valve inlet 38 in connection with the conduit 10.

It is to be understood that any number of the cradles with their reflectors may be used, the showing in Fig. 1 being only by way of example. It is also to be understood that the whole apparatus may be supported in a manner so that the cradle 21 will be disposed to the best advantage with respect to the sun's rays.

I claim:

1. In a solar generator, an endless fluid conduit of elongated loop form, one of the longer sides of said conduit loop being of a reduced cross sectional area, a plurality of heat insulating jackets enclosing intermediate portions of the side of the conduit of the lesser cross sectional area and having openings in the same through which the enclosed portions of the conduit are exposed, transparent closures for the said openings, and a reflecting means supported exteriorly of each of said jackets for concentrating the solar rays on said transparent closures and through them onto the exposed portion of said conduit.

2. In a solar generator, an endless fluid conduit of elongated loop form, one of the longer sides of said conduit being of a reduced cross sectional area, a plurality of heat insulating jackets enclosing spaced intermediate portions of the side of the conduit of the lesser cross sectional area and having openings in the same through which the enclosed portions of the conduit are exposed, transparent closures for the said openings, a reflecting means supported exteriorly of each of said jackets for concentrating the solar rays on the transparent closure and through it onto the exposed portion of said conduit, and temperature indicators carried by the portions of the conduit exposed between and at the opposite ends of said jackets.

3. In a solar generator, an endless fluid conduit, of elongated looped form, one of the longer sides of said conduit being of a reduced cross sectional area, a plurality of heat insulating jackets enclosing spaced intermediate portions of the side of the conduit of lesser cross sectional area and having openings in the same through which the enclosed portions of the conduit are exposed, transparent closures for the said openings, a reflecting means supported exteriorly of each of said jackets for concentrating the solar rays on said transparent closures and through them onto the exposed portions of said conduit, and means for circulating a fluid through said conduit.

4. In a solar generator, an endless fluid conduit, of elongated looped form, one of the longer sides of said conduit being of a reduced cross sectional area and a plurality of heat insulating jackets enclosing spaced intermediate portions of the side of the conduit of lesser cross sectional area and having openings in the same through which the enclosed portions of the conduits are exposed, transparent closures for the said openings, a reflecting means supported exteriorly of each of said jackets for concentrating the solar rays on said transparent closures and through them onto the exposed portions of said conduit, means for circulating a fluid through said conduit, and a radiator connected in said conduit to radiate the heat of the heated fluid therein.

5. In a solar generator, an endless fluid conduit, a heat insulating jacket enclosing an intermediate portion of said conduit and having an opening in the same through which the enclosed portion of the conduit is exposed, a transparent closure for the said opening, diverging members extending outwardly from said jacket from opposite sides of the said opening therein, a frame carried at the outer ends of said members, and a reflecting means carried by said frame and arranged to concentrate the solar rays on said transparent closure and through it onto the exposed portion of said conduit.

6. In a solar generator, an endless fluid conduit, a heat insulating jacket enclosing an intermediate portion of said conduit and having an opening in the same through which the enclosed portion of the conduit is exposed, a transparent closure for the said opening, said closure having inner and outer walls spaced apart to form a dead air chamber therebetween, divergent members extending outwardly from said jacket from opposite sides of the said opening therein, a frame carried at the outer ends of said members, and sectional reflecting means carried by said frame and arranged to concentrate the solar rays on said transparent closure and through it onto the exposed portion of said conduit.

7. In a solar generator, an endless fluid conduit of elongated loop form, one of the longer sides of said conduit loop being of a reduced cross sectional area, a plurality of heat insulating jackets enclosing intermediate portions of the side of the conduit of the lesser cross sectional area and having openings in the same through which the enclosed portions of the conduit are exposed, and a reflecting means supported exteriorly of each of said jackets for concentrating the solar rays on the exposed portions of said conduit.

EDMUND J. D. COXE.